Oct. 29, 1946.                     C. M. CUMMINS                     2,410,204
                                SPLIT RING MANUFACTURE
                     Filed Dec. 6, 1943                 2 Sheets-Sheet 1
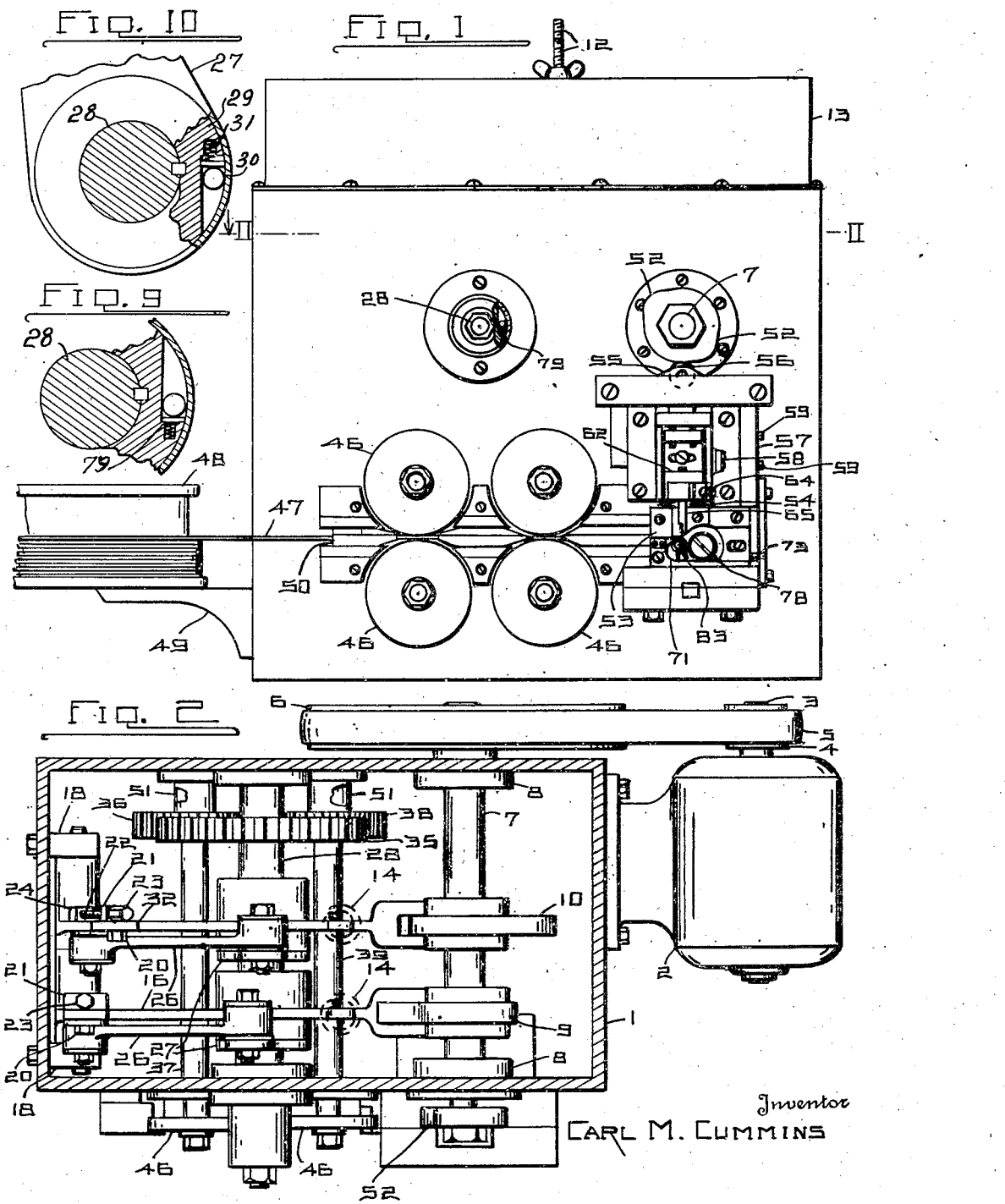
Inventor
CARL M. CUMMINS Oct. 29, 1946.     C. M. CUMMINS     2,410,204
SPLIT RING MANUFACTURE
Filed Dec. 6, 1943     2 Sheets-Sheet 2
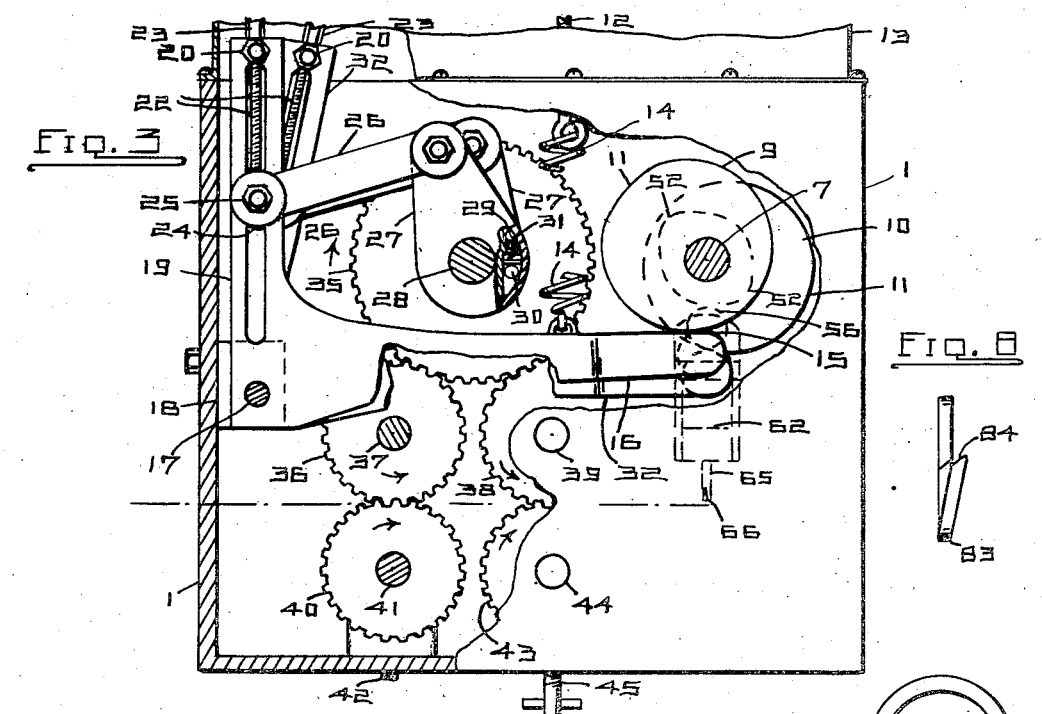
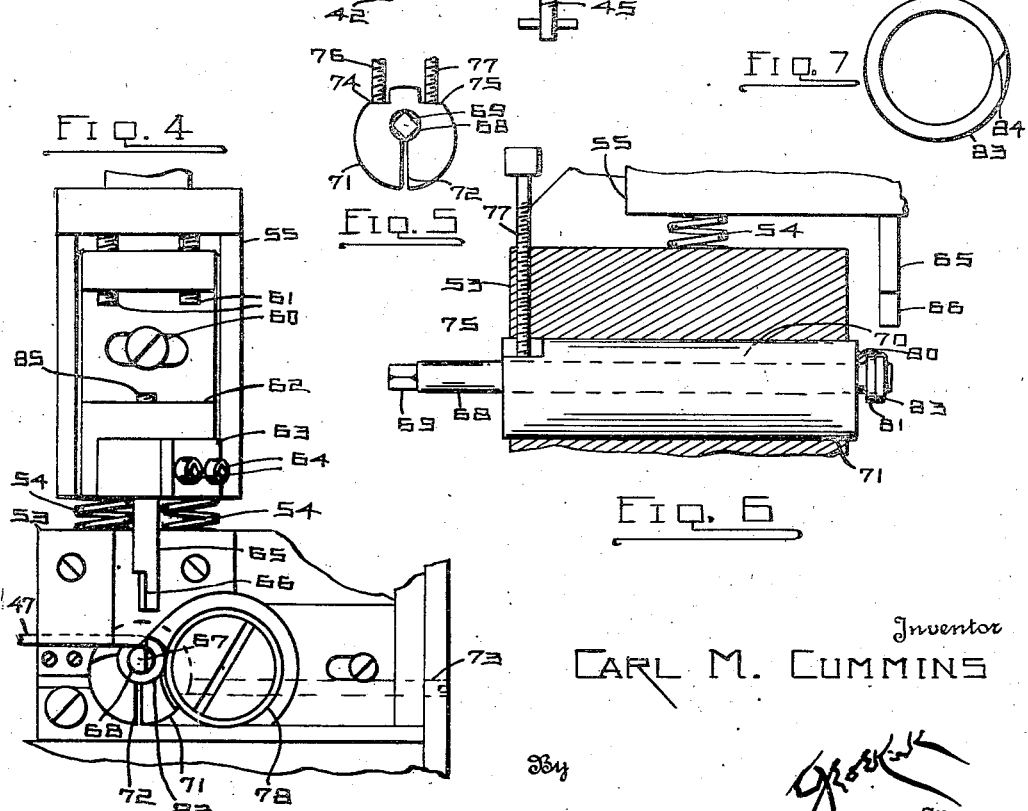
Inventor
CARL M. CUMMINS
By
Attorney Patented Oct. 29, 1946

2,410,204

UNITED STATES PATENT OFFICE 2,410,204

SPLIT RING MANUFACTURE

Carl M. Cummins, Toledo, Ohio

Application December 6, 1943, Serial No. 513,068

5 Claims. (Cl. 10—73)

1

This invention relates to making strip or wire stock into split or spring washers.

This invention has utility in feeding, bending and cutting washer lengths from stock, and in the mechanism for performing the operations in sequence, and herein specifically shown as two washers per revolution of the power drive or main shaft.

Referring to the drawings:

Fig. 1 is a front view of an embodiment of the invention in a power machine, parts being broken away;

Fig. 2 is a section on the line II—II, Fig. 1, looking down on the transmission features of the invention;

Fig. 3 is another front view, having portions of the housing of Fig. 1 broken away, to further show the transmission;

Fig. 4 is a fragmentary view on an enlarged scale of the mounting for the cutting off elements of the machine and the stock receiving mandrel;

Fig. 5 is a detail view of the holder for the mandrel from the back or rear of the showing in Fig. 4;

Fig. 6 is a fragmentary view of the cutting tools, showing lengthwise view of the mandrel as mounted thereby;

Fig. 7 is a side view of a completed split washer;

Fig. 8 is an edgewise view of the washer of Fig. 7;

Fig. 9 is a fragmentary detail of a backlash preventing clutch for the intermittent grip carrying shaft; and Fig. 10 is a fragmentary detail of a clutch for one of the intermittent grip devices.

Main housing 1 (Fig. 2) has motor 2 mounted thereon. From shaft 3 of the motor 2, having pulley 4, extends belt 5 to drive flywheel pulley 6 fixed on main drive shaft 7 mounted in bearings 8 of the housing 1.

Herein there is shown an intermittent grip device transmission for feeding or propelling the strip stock or wire to be formed into single split rings or spring washers. To this end, there is fixed with the shaft 7 cams 9, 10, of general eccentric form, except that medially of the major throw extent of each thereof is a concentric or dwell portion. Under the layout adopted herein, this dwell portion 11 is approximately 34° (Fig. 3).

Adjustable stems 12 upwardly protruding thru upper housing section 13, regulate the pull or tension of helical springs 14. One of the springs 14 holds roller 15 of arm 16 against the underside of the cam 9. The arm 16 has pivotal mounting 17 in bracket 18 carried by the housing 1 remote from the motor 2. Fixed with the arm 16 is upwardly extending slotted arm 19. Adjacent the upper or free end of the arm 19, a nut 20 mounts a collar 21 to hold a threaded stem 22 against longitudinal movement. The stem 22 has polygonal head or end 23 for rotation. The stem lower portion extends thru a block 24 slidable in the slot of the arm 19 as the stem 22 is rotated. The block 24 has pivotal connection 25 to a link 26 to crank arm 27 loose on the shaft 28. Fixed with the shaft 28 is complementary intermittent grip element 29 having seats for rollers 30 normally thrust by springs 31 into one way gripping relation for direct clockwise rotation of the shaft 28.

The cam 10, 180° from the cam 9, operates angle lever 32, similar to the angle lever 16, 19. This means that at each rotation of the drive shaft 7 there are two steps given to the shaft 28.

Fixed on the shaft 28 is a gear 35 the clockwise step by step rotation of which is transmitted to minor diameter gears 36 on a shaft 37 and 38 on a shaft 39. The gears 36, 38 have counterclockwise rotation, and mesh with additional gears. The gear 36 meshes with a gear 40 on a shaft 41 adjustable by means 42 as to the mesh relation. The gear 38 meshes with a gear 43 on a shaft 44 adjustable by means 45 as to the mesh relation. These shafts 37, 39, 41, 44, protrude from the housing 1 and there carry respectively stock gripping feed rollers 46. The lower pair of shafts 41, 44, rotate clockwise, and in the adjustable mesh feature may determine the positive gripping of say flat-sided wire stock 47 from a spool 48 on bracket 49 from the housing 1. The stock 47 from the supply coil or spool 48 enters way 50 in its feed transit to and past the rollers 46. For the rear ends of the shafts 41, 44, bearings 51 compensate for the slight rocking adjustment needful in practice to effect the desired feed gripping for the stock 47.

The main drive shaft 7 protrudes thru the front side of the housing 1 and there carries a cam having two diametrically disposed projections or major diameter portions 52 located for out-throw action during the respective dwell intervals 11 of the cams 9, 10. From block 53 fixed with the front of the housing 1 (Fig. 1), compression helical springs 54, thrust upward member 55, which at its upper portion has a roller 56 thereby yieldably riding against the cam and thrown by the portions 52.

The slide member 55 is mounted against play in a slide way 57 with shims or wear plate sides 58 adjusted by screws 59. The member 55 has adjusted thereon by screws 60, 61, a holder member 62 (Fig. 4). A clamp plate 63 is anchored therewith by screws 64 to mount shear off or thrust cutting tool 65 having angle face 66 complementary to opposing angle face 67 on element or mandrel 68. The mandrel or rod tool 68 as extending rearwardly has polygonal end portion 69 for rocking into appropriate working relation to the line of direction for the face 66 of the tool 65 as thrust theretoward.

The mandrel 68 is in eccentric recess 70 of a cylindrical holder 71 having a split or slot 72 to the recess or way 70 (Figs. 3, 4). Screws 73 in the fixed member 53 may act on a side of the split holder 71 to effect pinch or grip action for locking the mandrel 68 in the holder 71. Accuracy in placing the protruding or front portion of the mandrel 68 is taken care of, not only by this pinching or clamping, but more minutely as a preliminary set, or even thereafter, ledge portions 74, 75 at the rear upper end of the cylindrical holder 71, are contacted by screws 76, 77 (Fig. 5). As one of these screws is backed off, and the other thrust down, micrometer-like angular shifting of the holder 71 is effected.

The stock 47, as passing the way 50 and directed forcibly by the pinch or grip rollers 46, is directed over the mandrel 68 and there abuts the periphery of loose or free roller 78. Initially the free end of the stock 47 is given wrap direction as to the mandrel 68. The roller 78 is an antifriction abutment but of friction direction cooperation for holding the stock 47 to the mandrel 68 during each feed interval. This interval for each feed step is a full wrap of the mandrel 68, of the diameter desired for the spring washer product.

This feed step is definite and accurate as to the adjustment regulated by the slotted arms of the angle levers of the intermittent grip devices. The shaft 28, as it protrudes thru the front of the housing 1, there carries a back-lash prevention means or reverse grip 79 (Fig. 1) opposite to the grip devices in the crank arms 27. This means that during the idle or recovery travel of the arms 27, the shaft 28 is locked against other than the next clockwise feed.

The wire wrapping about the mandrel 68 is herein directed for an entering wrap 80 (Fig. 6) with a full adjacent wrap 81 and the cutting tool 65 having its face 66 for descent to shear off wrap 83 as a completed spring lock washer of the split ring type. The cut face 84 has an angle or pitch, while approximately radial, with sufficient peripheral shortage or clearance for collapse, but insufficient for interlocking or snarled assembly of the washers with each other.

It is to be noted that the power load on the machine of the disclosure herein approximates a constant. However, as the feed operations are intermittent, there being shown two intermittent grip transmissions from the main drive shaft 7 to the upper and lower feed rollers on pairs 46 for gripping the wire stock 47 as thrust along, the intervals between the steps of the grip feeding are holding intervals of rest for the stock 47, and in such intervals the shear or cut-off device is effective. The cut-off operation occurs twice in each revolution of the shaft 7 with its two eccentrics 9, 10, at the dwell or intervals of idle or non-actuation of the intermittent grip devices.

The range and nicety of the adjustments are of importance. The adjustment of the grip action of the feed insures the definite thrusting or progress which means that the feeding operation in reality effects the forming or reworking in its sliding about the stationary mandrel 68. The friction of the thrust against the roller 78 is sufficient to cause it to turn or rotate with the wire being re-formed into the coil. The abutment 78 as it is turned or rotated by the force feeding of the stock, serves as a sort of anti-friction element in the production of the wraps on the mandrel 68. As the wraps are in succession thereon, they take a pitch which is a factor for a spring washer. Furthermore, the angle at the opening or cut 84 has ample clearance for the collapse or flattening of the ring without expansion or enlarging of its diameter, but is of such angularity as to not leave opening for the washers to be assembled into a chain or snarl relation.

There is possible great nicety for locating the cut 84. The clamp 63 permits definite vertical and angular positioning of the shear member or cut-off plunger 66 active face. In appropriate clearance for complementary shear location, the relatively fixed member face 67 of the mandrel 68 is adapted to a most fine adjustment in adequate ranges. Due to the way 70 being eccentric of the sleeve 71, rocking of the sleeve in the block 53 may position the mandrel up, down, or laterally. This rocking axially is accurately locked by the screws 76, 77. The mandrel in itself may be turned by a tool on the polygonal portion 69, to give a desired angularity to the face 67. A screw 85 in the block 62 adjusts the feed projection of the tool 65.

What is claimed and it is desired to secure by Letters Patent is:

1. A wrap receiving mandrel, an eccentric holding sleeve therefor, said sleeve being split and having ledge means, a mounting block for the sleeve, and adjusting screws for acting on the ledge means to rock the sleeve and to act on the split to fix the mandrel in the sleeve and the sleeve in the block.

2. A split washer manufacturing machine, comprising a housing, a drive shaft and a driven shaft journaled in said housing, two intermittently acting grip devices to drive the driven shaft, means to actuate the grip devices from the drive shaft, a guide way for wire stock, two pairs of pressure adjusted gripping rolls to feed the wire stock from a supply source through said guide way, means to drive said feed rolls from said drive shaft, a mandrel receiving the wire from said feed rolls, a rotary abutment adjacent to and coacting with said mandrel to wrap said wire about said mandrel, a cut off plunger having a severing edge to sever a convolution of said wire on the mandrel, and a cam on the drive shaft to actuate the plunger.

3. A split washer manufacturing machine, comprising a housing, drive and driven shafts journaled in said housing, intermittent grip devices to actuate the driven shaft from the drive shaft, a guide way for wire stock, two pairs of pressure adjusted gripping rolls to feed the wire stock from a supply source through said guide way, means to drive said feed rolls from said drive shaft, a mandrel receiving the wire from said feed rolls, a rotary abutment adjacent to and coacting with said mandrel to wrap said wire about said mandrel with a pitch direction therefor, said mandrel having an angularly disposed shear face, a cut off plunger having a severing edge complementary to the shear face of the mandrel to sever a convolution of said wire on the mandrel, and a cam on the drive shaft to actuate the plunger.

4. A split washer manufacturing machine, comprising a housing, drive and driven shafts journaled in said housing, intermittent grip devices to actuate the driven shaft from the drive shaft, a guide way for wire stock, two pairs of pressure adjusted gripping rolls to feed the wire stock from a supply source through said guide way, means to drive said feed rolls from said drive shaft, a mandrel receiving the wire from said feed rolls, a rotary abutment adjacent to and coacting with said mandrel to wrap said wire about said mandrel, a cut off plunger having a severing edge to sever a convolution of said wire on the mandrel, said mandrel having an opposing complementary face to said cutting edge, adjustment means between the mandrel and plunger to vary the position between said edge and face, and a cam on the drive shaft to actuate the plunger.

5. A strip stock handling machine, comprising a housing, a drive shaft and a driven shaft journaled in said housing, two intermittently acting grip devices to drive the driven shaft, independently adjustable means to actuate the grip devices from the drive shaft, a guide way for the strip stock, opposing pressure adjusted gripping rolls to feed the strip stock from a supply source thru said guide way, means to drive said feed rolls from said drive shaft, a receiver to engage the strip stock from the feed rolls, receiver opposing means including a plunger, and a cam on the drive shaft to actuate the plunger to engage the stock at the receiver.

CARL M. CUMMINS.